Jan. 29, 1946.  C. H. BRAMHALL  2,393,605
AUTOMATIC WINDOW WIPER
Filed Dec. 2, 1943   3 Sheets-Sheet 1

INVENTOR
Charles H. Bramhall
BY
ATTORNEY

Jan. 29, 1946.  C. H. BRAMHALL  2,393,605
AUTOMATIC WINDOW WIPER
Filed Dec. 2, 1943  3 Sheets-Sheet 2

INVENTOR
Charles H. Bramhall
BY
ATTORNEY

Jan. 29, 1946.    C. H. BRAMHALL    2,393,605
AUTOMATIC WINDOW WIPER
Filed Dec. 2, 1943    3 Sheets-Sheet 3
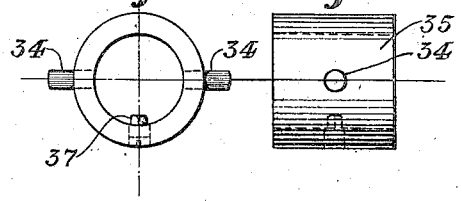
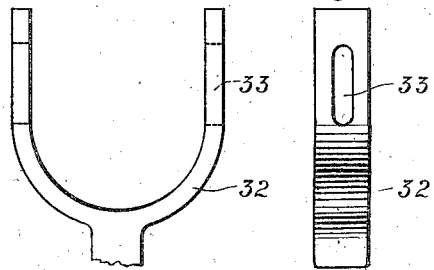
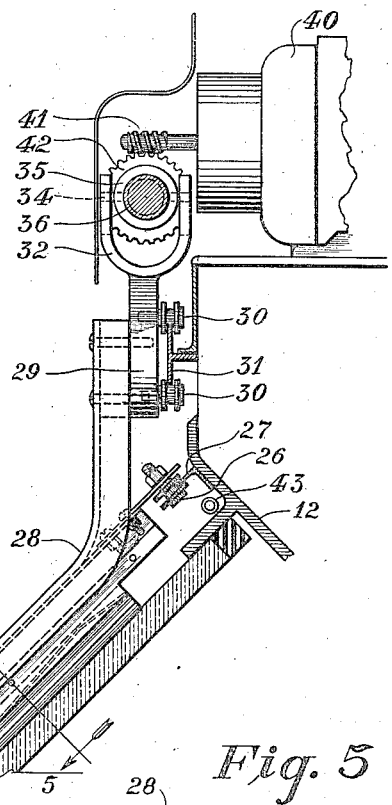
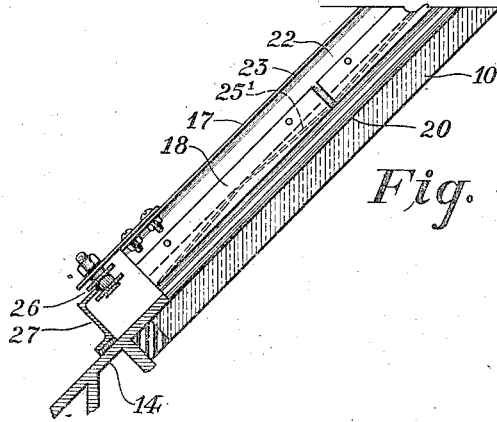
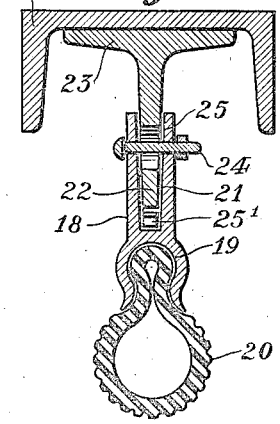
INVENTOR
Charles H. Bramhall
BY
ATTORNEY Patented Jan. 29, 1946

2,393,605

UNITED STATES PATENT OFFICE 2,393,605

AUTOMATIC WINDOW WIPER

Charles H. Bramhall, Silver Spring, Md.

Application December 2, 1943, Serial No. 512,554

4 Claims. (Cl. 15—253)

(Granted under the act of March 3, 1883, as
amended April 30, 1928; 370 O. G. 757)

This invention relates to window wipers and it has a particular relation to automatic wipers for use with windows having edges disposed at an angle to the horizontal edges of the window and to the rectilinear path of movement of the wiper.

The principal object of this invention is the provision of a wiper of the character described which is adapted to traverse the surface of the window glass in a rectilinear direction until it nearly reaches one end and then to swing about a horizontal pivot so as to complete its stroke in a position adjacent to and parallel with the inclined edge of the glass, thus to remove moisture and foreign matter from the entire surface thereof.

In order to make the invention more clearly understood there are shown in the accompanying drawings, means for carrying the invention into practical effect, without limiting the improvements in their useful application to the particular constructions which for the purpose of explanation has been made the subject of illustration.

In the accompanying drawings:

Fig. 4 is a vertical transverse sectional view taken on line 4—4 of Fig. 3;

Fig. 5 is an enlarged transverse sectional view taken on line 5—5 of Fig. 4;

Fig. 6 is an end view of the nut which cooperates with the driving screw;

Fig. 7 is a side elevational view of the structure shown in Fig. 6;

Fig. 8 is an end view of the operating yoke member; and

Fig. 9 is a side elevational view of the structure shown in Fig. 8.

Figure 1:
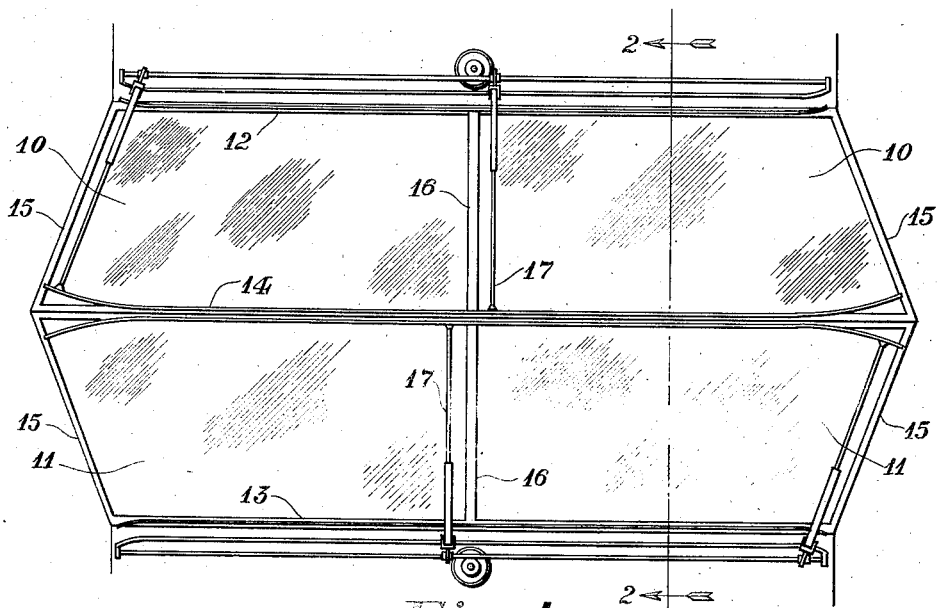
Fig. 1 is a front elevational view of a double paned window of an air terminal control tower.
Figure 2:
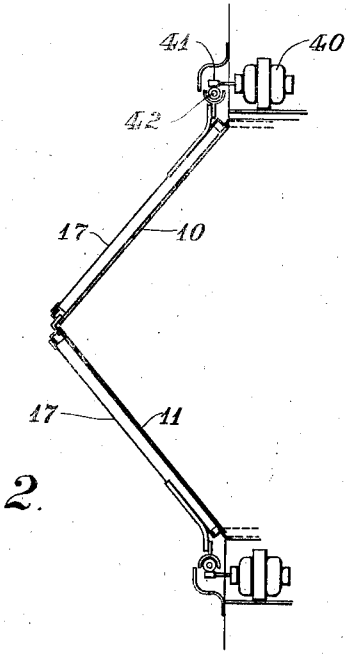
Fig. 2 is a vertical sectional view taken on line 2—2 of Fig. 1.

Referring to the drawings, a plurality of window wipers constructed in accordance with the present invention are shown as cooperating with the panes or lights of a window of an aircraft control tower which in its essentials comprises upper and lower pairs of panes of glass 10 and 11 disposed at an angle to the horizontal and supported by a window frame having upper, lower and intermediate horizontal transom members 12, 13 and 14 respectively, inclined outer mullions 15 and intermediate mullions 16.

Figure 3:
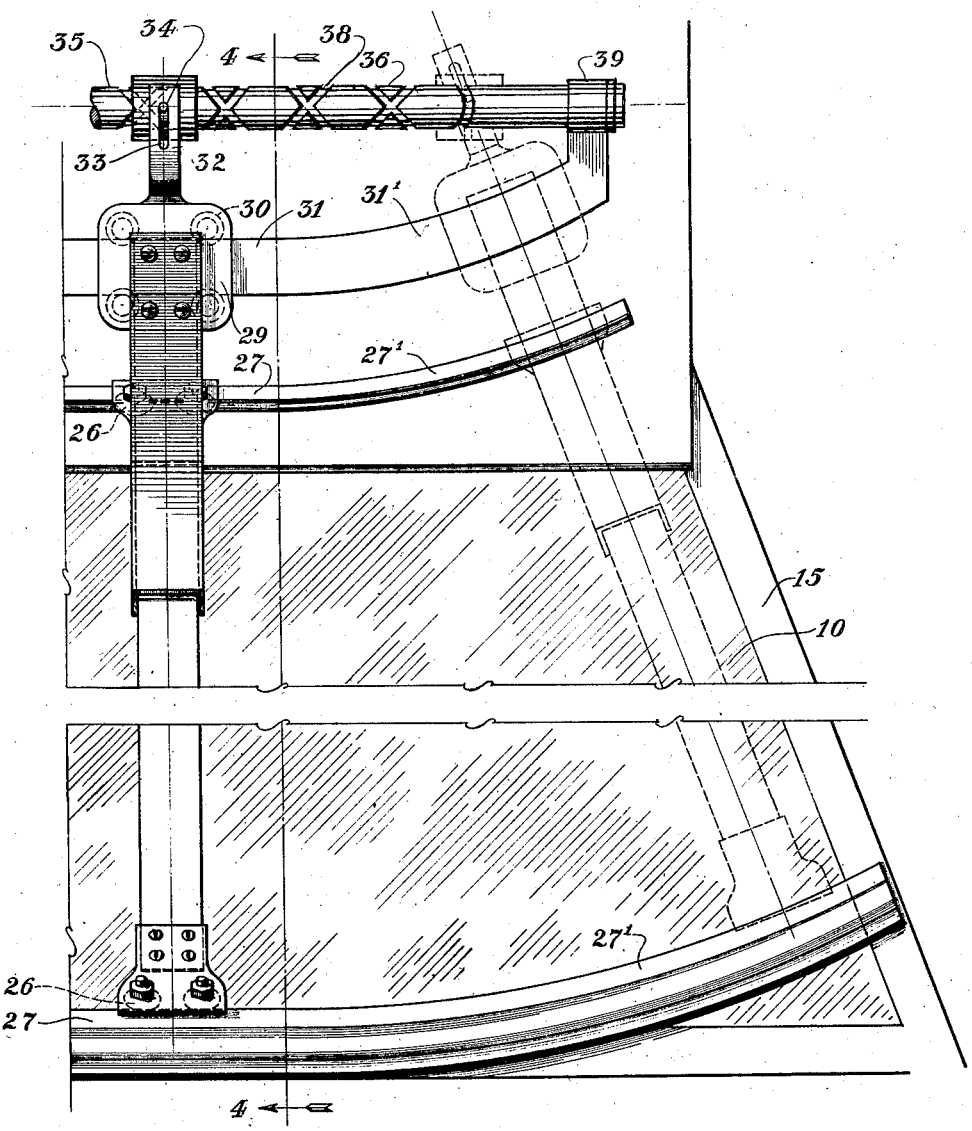
Fig. 3 is an enlarged fragmentary view of the structure shown in Fig. 1, illustrating one of the improved wipers and operating mechanism in detail.

With particular reference to Figs. 3, 4 and 5 of the drawings, on each of the panes of glass 10 and 11 is a wiper member 17 comprising an arm 18 formed with an inner longitudinally extending channel 19 for gripping engagement with a tubular wiping element 20 of rubber or the like disposed in frictional wiping contact with the glass pane 10 and an outer longitudinally extending channel 21 which loosely engages a web 22 of a supporting bar 23 for limited movement in a direction normal to the plane of the glass and which is maintained against displacement therefrom by pins 24 engageable with slots 25 formed in the web 22. The arm 18 is urged outwardly by a leaf spring 25' which is disposed within the channel 21 between the web 22 and said arm. The supporting bar 23 is provided at its end with upper and lower pairs of flanged rollers 26 disposed in rolling engagement with upper and lower supporting and guiding rails 27.

Each of the wiper members 17 is reciprocated longitudinally of its glass pane by means of a substantially L-shaped arm or bracket 28 of channel cross-section the lower portion of which straddles and loosely engages the supporting bar 23 and the upper end of which is fixed to a plate 29 having a plurality of grooved rollers 30 mounted on its inner face for rolling engagement with the opposite edges of a guide rail 31 mounted on the window structure adjacent the upper transom 12. The plate 29 is provided with an upwardly extending yoke 32 having slots 33 formed in the arms thereof for pivotal engagement with diametrically disposed pins 34 provided on a sleeve 35.

The sleeve 35 is mounted on and travels back and forth along a shaft or spindle 36 and is provided with a pivoted feather key 37 for engagement with a pair of helical grooves 38 of opposite pitch provided in the screw 36. The shaft 36 is rotatably mounted at its ends in upwardly extending ears 39 formed on the outer ends of the guide rail 31 and is rotated in the same direction by means of an electric motor 40 mounted on the frame structure of the window, through the medium of a worm 41 which is fixed to the motor shaft and which meshes with and drives a worm wheel 42 fixed to the shaft 36 intermediate its ends.

The outer extremities of the guide rails 27 and 31 are curved about a point substantially in line with the outer or inclined mullions 15, as indicated at 27' and 31' so that as the wiper approaches its outer limit of travel it will be caused to swing about said point and terminate its movement adjacent to and parallel with the inclined outer edge of the glass pane of the window, thus traversing the entire surface thereof and removing all moisture and foreign matter therefrom. Water for washing purposes may be supplied from spray pipes 43 arranged above the panes 10. During this swinging movement of the wiper the slots 33 permit the wiper as an entirety to ride upwardly relative to the pivot pins 34 and thus to shift transversely of the rotary shaft, as indicated in dotted lines in Fig. 3.

From the foregoing it will be apparent that there is provided a very efficient, rugged and positive acting wiper having the capability of clearing for view the entire surface area of a window having inclined side edges, which is particularly desirable for windows such as those frequently employed in aircraft control and observation towers.

It will be understood, as previously stated that the above description and accompanying drawings comprehend only the general and preferred embodiment of the invention and that various changes in construction, proportion and arrangement of the parts may be made within the scope of the appended claims without sacrificing any of the advantages of the invention.

The invention described herein may be manufactured and used by or for the Government of the United States of America for governmental purposes without the payment of any royalties thereon or therefor.

I claim:

1. In combination with a window pane having a horizontal edge and an outer edge inclined to said horizontal edge, a wiping element for removing moisture and foreign matter therefrom, means for moving said wiping element over said window pane, a guide rail mounted adjacent to said window pane and provided with a horizontal portion and a curved outer portion adjacent to said inclined edge, and means on said wiping element disposed in engagement with said guide rail for causing said wiping element to move across a portion of said window pane in a rectilinear path while traversing the horizontal portion of said guide rail and to swing in a curved path upon engagement with the curved portion thereof so as to assume a position substantially parallel to said inclined edge at the termination of its movement over said window pane.

2. In combination with a window pane having a horizontal edge and an outer edge inclined to said horizontal edge, a wiping element for removing moisture and foreign matter therefrom, a screw having helical grooves therein of opposite pitch operatively connected with said wiping element for moving the same over said window pane alternately in opposite directions, a guide rail mounted adjacent to said window pane and provided with a horizontal portion and a curved outer portion adjacent to said inclined edge, and a plurality of rollers on said wiping element disposed in engagement with said guide rail for causing said wiping element to move across a portion of said window pane in a rectilinear path while traversing the horizontal portion of said guide rail and to swing in a curved path upon engagement with the curved portion thereof so as to assume a position substantially parallel to said inclined edge at the termination of its movement over said window pane.

3. In combination with a support, a window pane mounted thereon and inclined to the vertical, a wiper element for removing moisture and foreign matter from said window pane, means carried by said support for moving said wiper element over said inclined window pane, a guide rail for said wiper element, said guide rail having a portion guiding said wiper element in a substantially rectilinear path through a portion of its travel over said inclined window pane, said window pane having an outer edge inclined to the rectilinear path of movement of the wiper element, said guide rail having an outer portion curved so as to cause said wiper element to swing outwardly in a curved path as it approaches its limit of travel toward said inclined edge and to assume an inclined position substantially parallel to said inclined outer edge at the termination of its path of movement over said window pane, said wiper moving means including means connected to said wiper element for movement therewith, and a guide member on said support for guiding said connecting means, said guide member having a rectilinear portion and a curved outer portion substantially corresponding to the rectilinear and curved portions of said guide rail first mentioned.

4. In combination with a window pane, a wiping element for removing moisture and foreign matter therefrom, means for moving said wiping element over said window pane alternately in opposite directions comprising a rotary shaft having helical grooves therein of opposite pitch and means operatively connecting said wiping element with said rotary shaft, a guide rail for said wiping element, said guide rail having a portion guiding said wiping element in a substantially rectilinear path through a portion of its travel over said window pane, said window pane having an outer edge inclined to the rectilinear path of movement of the wiping element, said guide rail having an outer portion curved so as to cause said wiping element to swing outwardly in a curved path as it approaches its limit of travel toward said inclined edge and to assume an inclined position substantially parallel to said inclined outer edge at the termination of its path of movement over said window pane, said connecting means providing a connection enabling said wiping element to shift transversely of said rotary shaft during its movement on said guide rail and along said shaft.

CHARLES H. BRAMHALL.